J. L. GRAHAM
CULTIVATOR.
No. 106,354.  Patented Aug. 16, 1870.
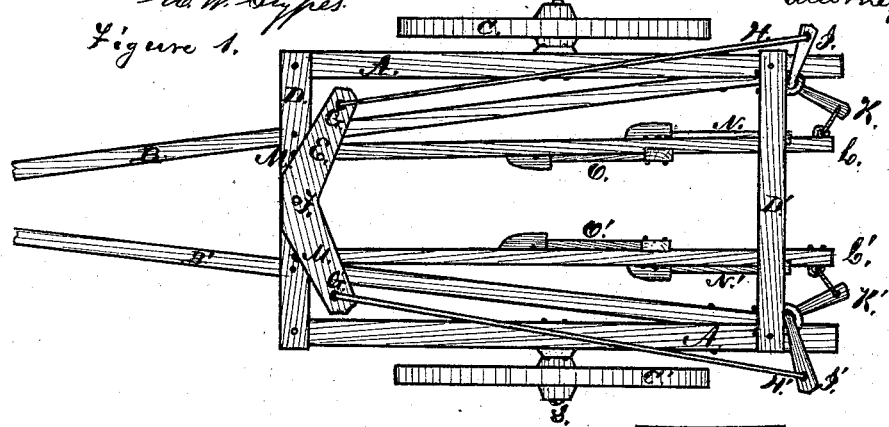
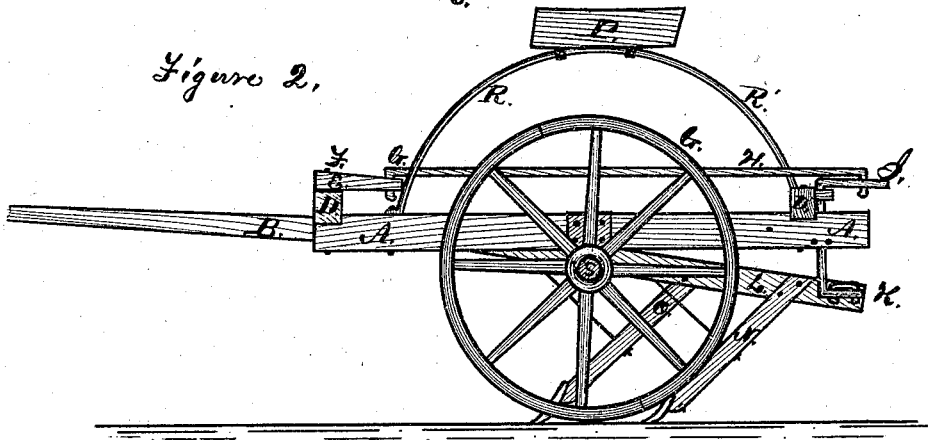

UNITED STATES PATENT OFFICE.

JOHN L. GRAHAM, OF BENTLEY STATION, ILLINOIS.

IMPROVEMENT IN CULTIVATORS.

Specification forming part of Letters Patent No. 106,354, dated August 16, 1870.

*To all whom it may concern:*

Be it known that I, JOHN L. GRAHAM, of Bentley Station, county of Hancock, Illinois, have invented a new and useful Improvement in Cultivators; and I do hereby declare the following to be a full, clear, and exact description thereof, reference being had to the accompanying drawings, and to the letters of reference marked thereon, in which—

Figure 1 is a plan or top view of a cultivator with my improvement. Fig. 2 is a side elevation of the same.

This invention relates to what are known as "riding-cultivators;" and it consists in the arrangement of certain parts by which the plow may be guided to follow the row of plants by the feet of the driver. The driver is mounted on seat P on frame A of such a cultivator, which is mounted on wheels C C', B B' being the tongue. The feet of the driver rest against the ends of part E, which is pivoted to frame A at F, so as to be movable. The rods H H' connect the ends G G' of part E with crank-arms I I' of the vertical shafts, which turn in bearings at the sides of the back end of frame A, and have crank-arms K K' at their lower ends, extending horizontally, but at different angles from I I', as shown in the drawings. The arms K K' have rods which connect their ends with the back ends of the beams L L', on which the two sets of plows N O and N' O' are mounted. The beams L L' are hinged by universal joints or clevises to the front cross part, D, of frame A, so as to be drawn on the two sides of a row of plants with their plows.

The joints of all the above-mentioned connections are flexible, and the whole made and arranged so that the driver by pressing on either end of part E will, by the action of the before-mentioned train of parts, move the plows to one side or the other to follow the row of plants, as required in such cultivators.

What I claim is—

The combination and arrangement of the pivoted part E, rod H, crank I, its vertical shaft and lower crank-arm, K, and connecting-rod to back end of frame L, substantially as and for the purpose specified.

JOHN L. GRAHAM.

Witnesses:
 SAMUEL JACOB WALLACE,
 CHAS. GRUCER.